(12) United States Patent
Goldberg et al.

(10) Patent No.: US 6,266,639 B1
(45) Date of Patent: Jul. 24, 2001

(54) METHOD AND APPARATUS FOR PROVIDING NOTIFICATION OF PRE-ESTABLISHED SHORTHAND NOTATION

(75) Inventors: Randy G. Goldberg, Princeton; Amir M. Mane, Lincroft, both of NJ (US)

(73) Assignee: AT&T Corp, New York, NY (US)

( * ) Notice: Subject to any disclaimer, the term of this patent is extended or adjusted under 35 U.S.C. 154(b) by 0 days.

(21) Appl. No.: 09/083,860

(22) Filed: May 22, 1998

(51) Int. Cl.[7] ............................. G10L 15/06; G10L 21/06
(52) U.S. Cl. ....................... 704/270; 704/275; 704/235
(58) Field of Search .................................. 704/235, 270, 704/275, 276; 707/1, 2, 6; 379/88.13, 207, 213, 214

(56) References Cited

U.S. PATENT DOCUMENTS

| | | | |
|---|---|---|---|
| 4,041,467 | * | 8/1977 | Cota et al. ............................. 364/900 |
| 5,077,607 | * | 12/1991 | Johnson et al. ......................... 358/86 |
| 5,687,254 | * | 11/1997 | Poon et al. ............................. 382/229 |

OTHER PUBLICATIONS

Mastering Window 3.1 Special Edition by Corvait (pp 908), 1992.*

* cited by examiner

Primary Examiner—Richemond Dorvil
Assistant Examiner—Susan McFadden

(57) ABSTRACT

A method and apparatus for reminding users who enter information in longhand fashion that such information may also be accessed by entering a shorthand counterpart to the entered information. According to the present invention, a user enters an input identifier into a device such as a telephone. The present invention maintains in memory a set of valid longhand identifiers associated with their respective shorthand counterparts. Based on a comparison between the input identifier and the information maintained in memory, the present invention determines whether the input identifier is a longhand information item. If it is, the present invention accesses from memory the associated shorthand information item for the entered longhand information item. The present invention then presents the accessed shorthand information item to the user, so that in the future, the user will activate the longhand information item by entering the associated shorthand information item.

8 Claims, 2 Drawing Sheets

| SHORTHAND | LONGHAND |
|---|---|
| PETER | 667-1553 |
| TOM | 668-1566 |
| CHRIS | 669-1577 |
| HOME | 555-3010 |
| WORK | 668-1818 |

| SHORTHAND | LONGHAND | | |
|---|---|---|---|
| | TELEPHONE | FAX | E-MAIL |
| PETER | 667-1553 | 667-4884 | PETE@EMPLOY1.COM |
| TOM | 668-1566 | 668-2332 | TOM@EMPLOY2.COM |
| CHRIS | 669-1577 | 669-8712 | CHRIS@EMPLOY3.COM |
| JEN | 535-6742 | 535-1221 | JEN@EMPLOY4.COM |

METHOD AND APPARATUS FOR PROVIDING NOTIFICATION OF PRE-ESTABLISHED SHORTHAND NOTATION

BACKGROUND OF THE INVENTION

The present invention is directed to a method and apparatus for retrieving information that is in the form of shorthand notation and, in particular, to a method and apparatus that responds to the entry of information in the form of longhand notation by accessing and presenting to a user an item of shorthand information that is associated with the entered longhand information.

To say that communications today is light years ahead of communications a generation ago is as unremarkable, but yet truthful, an observation as saying that traveling by jets is a vast improvement over the horse and carriage. And yet in spite of the gargantuan technological leaps that have been made already over the past few decades, it seems that the frenetic pace at which science and technology expand our collective storehouse of knowledge continues to grow unabated. Look to almost any newspaper or almost any news channel and you will almost assuredly come across an abundance of stories proclaiming the "latest" advance in technology. No doubt the pursuit and application of scientific knowledge has supplanted all other institutions as the primary means by which the material condition of humanity is improved.

In perhaps no other realm of human action has this great wave of technological advance achieved more improvement than in the way we communicate with each other. In less than fifty years, we have moved far apace of the rotary phone to a world where communication through wireless and cellular telephones, satellites, modems, fiber optics, fax machines, and the Internet has become commonplace. Moreover, the content of modern communications is undergoing a fundamental shift as well; it is projected that in the near future the amount of data communication on a global basis will exceed the amount of voice communication. Industry is rapidly transforming the underlying telecommunications infrastructure in order to adjust to this seemingly imminent sea change.

The obvious efficiencies and enhanced convenience that these improvements have wrought have not come without certain new burdens, however. Despite the speed at which one person can now reach any other person almost anywhere in the world, a person wishing to reach another person must still enter a particular number or identifier that uniquely identifies the ultimate destination of the communication. By expanding the ways in which two people (or two computers) can communicate, the progress of technology has also increased the burden each person has in remembering multiple numbers or unique character identifiers. Thus, a person not only has to remember (or at least write down) multiple telephone numbers, but he also has to keep track of fax numbers, cellular numbers, and e-mail addresses, for example. For purposes of this discussion, any character string, whether numeric, alphabetical, or alphanumeric, that is used to reach a particular destination through any communication medium shall be referred to as an identifier.

Previously proposed systems have been developed to address this identifier "overload." Such systems allow users to associate each identifier with a particular shorthand notation. For example, for some time modern telephones have allowed callers to dial pre-stored telephone numbers by entering a simplified combination of keys intended to represent associated telephone numbers. More sophisticated systems retrieve and activate pre-stored identifiers based on a person's voice or a computer keyboard entry. For example, a caller may speak his friend's name into a telephone, and after recognizing the spoken name, the telephone retrieves a telephone number associated with the spoken name and makes a call based on the retrieved number. In computers, a person may type his friend's name and the computer will retrieve and use the friend's pre-stored e-mail address to send a message. These systems are also useful in paging systems, fax transmissions, and any other technology through which people may communicate with each other.

Such systems can facilitate the use of such communication mediums only if the users remember these shorthand notations. If a user forgets that another person's cell phone can be reached merely by speaking his name, the user will of course need to remember the actual cell phone number, or at least retrieve it from some recording medium. As a result, the ease of use and attendant efficiencies of such systems will deteriorate significantly if enough people forget their shorthand notations. What is therefore needed is a system that can remind users who use identifiers in longhand fashion that a shorthand notation for accessing the same communication service is available.

SUMMARY OF THE INVENTION

In order to maximize the use of pre-established shorthand identifiers in place of their associated longhand versions, the present invention is directed to a method and apparatus that retrieves, upon the entry of a longhand identifier, an associated shorthand identifier. The present invention then presents this accessed shorthand identifier to the user in some fashion, so that the next time the user intends to reach the same destination, the user will use the shorthand identifier in place of the associated longhand identifier. More particularly, the present invention receives an input identifier and provides a recognized identifier on the basis of the input identifier. On the basis of this recognized identifier, the present invention determines whether the recognized identifier corresponds to either a longhand information item or a shorthand information item. The present invention performs this determination by accessing any suitable memory means that associates each one of a plurality of longhand information items with a corresponding shorthand information item. Once the present invention determines that a recognized identifier is in longhand form, the present invention accesses the shorthand information item associated with the entered longhand information item. The present invention then presents the accessed shorthand information item through a predetermined communication medium, which may comprise a display or a microphone, for example.

DETAILED DESCRIPTION

Figures 1, 2A:
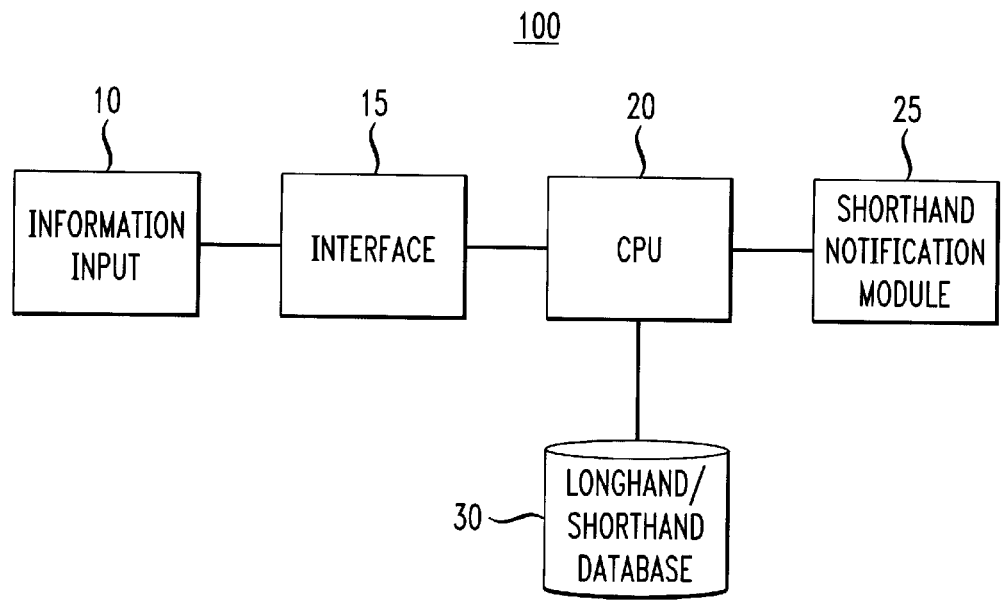
FIG. 1 illustrates a block diagram corresponding to the present invention.
FIGS. 2(a) and 2(b) illustrate exemplary tables used and maintained in memory by the system of FIG. 1.

FIG. 1 illustrates a system 100 for issuing shorthand notifications to users who enter an identifier in longhand form. For purposes of this discussion, the term "longhand" refers to any information that is maintained in its original form without having been abridged, truncated, or otherwise altered for the sake of expediency. The term "shorthand" refers to information that may be used as a substitute for a particular longhand information item; shorthand information, being named as such, will most often contain less information or at least appear in a simpler form than an associated item of longhand information. System 100 comprises an information input device 10 through which a user may enter such input identifiers as telephone numbers, e-mail addresses, web site addresses, and any other information intended to identify any person, place (electronic or physical), or thing (customer merchandise, bank account, etc.). In response to receiving an input identifier, device 10 produces a recognized identifier, which is a signal that is intended to contain the same information as the input identifier. The type of recognized identifier produced by information input device 10 depends on the specific instrument that serves as device 10. For example, information input device 10 may comprise a conventional telephone. A user may enter an input identifier, such as a telephone number, through the telephone's keypad, or the user may speak an input identifier into the telephone's microphone. If the user enters input identifiers through a telephone keypad, the system performs its operation on the basis of the touch-tone signals that such keypads normally produce. Thus, in this instance, the recognized identifier corresponds to analog touch-tone signals. On the other hand, if the user speaks input identifiers into a telephone microphone, the system 100 produces recognized identifiers that are in the form of digital codes that are intended to correspond exactly to the vocally provided information. In order to produce such speech-based recognized identifiers, system 100 would include any suitable speech recognizer (not shown), which would produce a recognized identifier on the basis of a spoken input identifier. Such a speech recognizer may comprise a HARK 3.0 recognizer, which digitizes an input voice signal and produces in response thereto a recognized identifier that is in the form of a digital code that is well known in the field of speech recognition. Other devices that may serve as information input device 10 include computers, which may communicate with the remaining components of system 100 through an intranet, client/server network, the Internet, or any other suitable communication medium. Of course, the information input device 10 need not be located remotely from the remaining components of the system 100; instead, the entire system 100 may be provided as a single, unitary apparatus. For example, in the field of telephony, the elements of FIG. 1, with the exception of interface 15, could be integrated together as a "system on a chip" and housed within the casing of a telephone. This integration may be achieved according to any suitable system integration technology. On the other hand, if device 10 is configured as a computer that is connected remotely to the remaining components of system 100, a user would enter the input identifier 100 through a keyboard, mouse, touch screen device, microphone, or any other device that is suitable for entering information through a computer. Further, an information input device that is located remotely from the other portions of system 100 need not be connected by a wire. The present invention is also intended to accommodate wireless input devices as well, such as cellular telephones, PCS (Personal Communication System) telephones, fax modems (which may be equipped on laptop or pocket computers), or pagers with messaging capabilities.

What all of these types of input devices have in common, regardless of how they are configured, is that they produce a recognized identifier in response to an input identifier and they provide such a recognized identifier to central processing unit (CPU) 20. As illustrated in FIG. 1, the recognized identifier may be provided through an interface 15, which in the case of telephonic communications may comprise a public switched telephone network ("PSTN"). Any suitable interface 15 may be used, so long as it is appropriate to the particular application at hand and is capable of delivering the recognized identifier in a form that is usable by CPU 20. Coupled to CPU 20 are shorthand notification module 25, which contains software instructions for guiding the operation of CPU 20, and longhand/shorthand database 30, which may comprise any memory device capable of storing linked items of information.

Figures 2B, 3:
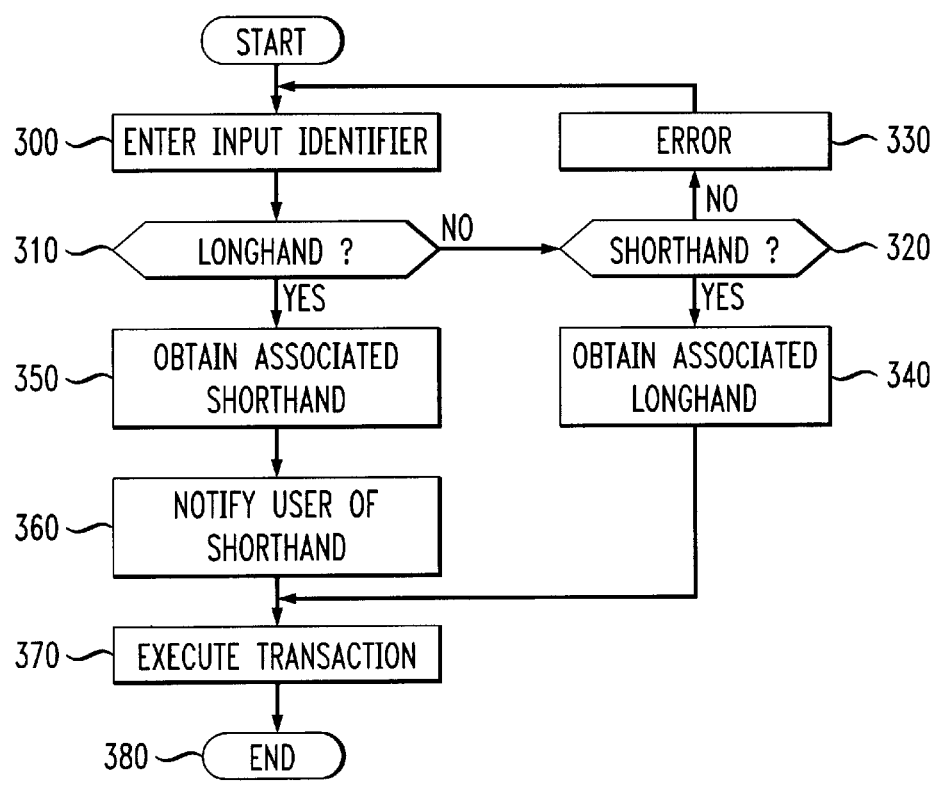
FIG. 3 illustrates a flow diagram outlining the operation of the system of FIG. 1.

FIG. 2(*a*) and 2(*b*) illustrate alternative manners in which the information stored in database 30 may be arranged. According to the tabular arrangement of FIG. 2(*a*), the left column corresponds to information that is intended to be a shorthand notation for the longhand notation on the right hand side. Each shorthand notation entry on the left hand side is linked to a longhand notation entry on the right hand side. In FIG. 2(*a*), the database 30 stores telephone numbers as longhand information, and each telephone number is linked to a particular name or generic location description. For example, the name Peter is associated with the telephone number 667-1555. A user intending to call Peter using this system need not remember his phone number; instead, the user may simply enter the name "Peter" through information input device 10. After producing a recognized identifier corresponding to the name "Peter", CPU 20 looks up in database 30 which number(s) is associated with this name. Based on the table of FIG. 2(*a*), CPU 20 would determine that the number 667-1553 is associated with the name Peter. Once this telephone number is determined, CPU 20 may supply the obtained number to a telephone network (not shown) for dialing the number. Thus, a user may call Peter without remembering Peter's telephone number. Furthermore, in a factory inventory system, the database may store generic product names as shorthand notations and their associated catalog or skew numbers as longhand notation. Of course, the database 30 is not limited to linking a single shorthand information item with a single longhand information item. The database 30 is capable of linking any categories of information that in combination may uniquely identify or access a particular person, location, or item. For example, as shown in FIG. 2(*b*), instead of just telephone numbers, the database 30 may also associate each shorthand notation with a particular cell phone number, e-mail address, fax number, or a particular web site address. In order to access longhand information items from a memory arranged as FIG. 2(*b*), a user would enter into information input device 10 a shorthand information item such as "Peter, fax" in order to activate Peter's fax number. Although the present discussion has centered on shorthand information items fashioned as names of people, the present invention encompasses any type of shorthand notation that facilitates the access of longhand information. Thus, an individual's telephone number need not be associated with his name; a numeric or other character string may also serve as the shorthand information item as well.

In order to preserve the usefulness of this shorthand notation system, the system 100 must be able to remind users who enter information in longhand fashion that such information may be entered more economically according to a shorthand notation. By minimizing the entry of information in longhand form, the system allows information to be entered more quickly. Further, users who are allowed to access longhand information by entering shorthand notation are liberated from the burdensome task of remembering dozens, if not scores, of telephone numbers, codes, passwords, and other non-intuitive information. While people who are saddled with too many numbers can always write them down somewhere, numbers that are written down may be lost or viewed by unauthorized persons. Thus, the present invention still provides an advantage over someone who writes or otherwise records numbers on some medium because the accessibility and confidentiality of such information is maintained by the present invention.

The usefulness of such a system should not be allowed to deteriorate by allowing people to forget that a particular longhand information item may be accessed by an associated shorthand information. Otherwise, if enough people revert to entering information in longhand fashion, then the overall performance of the system 100 will suffer. This performance degradation is especially likely to occur with respect to rarely used longhand information items. For example, a user is informed that another person's e-mail may be accessed by using a shorthand information item, such as a nickname. The user communicates with this person infrequently, so that the nickname is forgotten. If the user e-mails the person again, he can do so only by using the actual e-mail address, which most likely will require more time to enter into system 100. Thus, if enough people forget or otherwise no longer have access to such shorthand information items, then the efficiencies and security noted above will greatly diminish and perhaps vanish altogether.

What is needed to prevent such performance degradation from afflicting system 100 is to provide the means by which a user may be reminded of the shorthand notation for a particular longhand notation. By reminding users in this manner, they will resume using forgotten shorthand notations and the system 100 will not endure any significant performance shortcomings. In order to understand how system 100 can remind users of shorthand notations, reference is now made to FIG. 3, which illustrates a flow diagram that corresponds to the instructions maintained in shorthand notification module 25, under which CPU 20 operates. The procedure begins when a user enters an input identifier through information input device 10 (step 300). As stated before, the input identifier may be entered through a microphone, a computer keyboard, telephone keypad, touch screen display, or any other device through which information may be entered. After receiving the input identifier, CPU 20 produces a recognized identifier that is intended to correspond exactly to the information contained in the input identifier. CPU 20 then determines whether the recognized identifier comprises longhand information (step 310). In order to perform this determination, CPU 20 may compare the recognized identifier to the longhand portion of database 30 to see if a match exists with one of the entries provided therein. Alternatively, if the longhand and shorthand information items are each of standard length, CPU 20 may save time and processing resources by determining whether the amount of characters in the recognized identifier exceeds a predetermined threshold; if such a threshold is exceeded, CPU 20 will treat the recognized identifier as a longhand information item and attempt to find a match in the appropriate portion of the database 30. If such a threshold is not exceeded, then CPU 20 will have saved the effort of having to search the longhand portion of database 30.

Returning to FIG. 3, if CPU 20 determines that the recognized identifier is not in longhand form, CPU 20 next determines whether the recognized identifier is in shorthand form (step 320). CPU 20 accomplishes this by comparing the recognized identifier to the shorthand information items in database 30. If no match is found at this point, CPU 20 treats the recognized identifier as erroneous and causes a prompt device (not shown) to require the user to re-enter the input identifier (step 330). If a match is found between the recognized identifier and a shorthand information item, CPU 20 retrieves the longhand information item associated with the matched shorthand information item (step 340) and performs a particular operation or executes a particular transaction on the basis of the accessed longhand information (step 370).

If, in step 310, it is determined that the recognized identifier corresponds to a particular longhand information item, CPU 20 accesses the associated shorthand information item (step 350) and presents it to the user (step 360). For example, if the recognized identifier corresponds to the telephone number 555-3010, then, based on the table of FIG. 2, CPU 20 would access the associated shorthand item "Home" and present it to the user. By notifying the user of the shorthand notation for a particular longhand item of information, CPU 20 will remind the user that the longhand information item may be accessed by an easier-to-remember shorthand notation. After the user is presented with the associated shorthand information item, CPU 20 executes a transaction or performs an operation based on the accessed longhand information item (step 370). The manner in which the user is presented with the shorthand notation determined in step 360 depends on the type of information input device 10 that is used. For example, if the device 10 comprises a telephone, the user may be prompted with the shorthand information item by a remote voice prompt device. On the other hand, if the information input device 10 comprises a computer, then CPU 20 would notify the user of the shorthand information item through an associated display.

As an alternative, in order to ensure that the user will not ignore the shorthand information item, CPU 20 may be programmed to require the user to enter the shorthand information item before continuing with a desired operation. Thus, if the user enters the telephone number 555-3010 and the user is consequently prompted with the shorthand notation "Home," CPU 20 may be programmed to make the call only if the user first enters the shorthand notation through information input device 10. By operating in this manner, CPU 20 will train users to become accustomed to using shorthand notation in place of longhand notation.

The present invention thus allows users who have forgotten or are unaware of the shorthand way to access longhand information to learn such information without interrupting the operation of system 100. By allowing users to acquire shorthand notations in this manner, the present invention not only makes certain information-based transactions simpler to perform, it also enhances the efficiency of such operations by allowing the same transactions to be performed in response to the entry of information that is in compact form. By the same token, teaching users to use shorthand information items in the manner discussed above prevents the overall system performance from being significantly degraded and preserves precious processing resources for other tasks. Further, since the present invention is broadly concerned with systems directed to performing information-based transactions, it is relevant to such applications as telephony, e-mail service, paging, network communications (including the Internet), automated customer service or inventory information systems, and personal computer applications.

The above described embodiments are illustrative of the principles of the present invention. Other embodiments could be devised by those skilled in the art without departing from the spirit and scope of the present invention.

What is claimed is:

1. A training method for establishing a communication through a communication medium between at least a first entity and a second entity, the method comprising the steps of:

a) receiving an input identifier from an input device;

b) determining whether the input identifier corresponds to one of a longhand information item and a shorthand information item;

c) accessing, if the input identifier corresponds to the longhand information item, the shorthand information item associated with the longhand information item determined in step b);

d) presenting at an output device the accessed shorthand information item to at least one of the first entity and the second entity; and e) establishing the communication only if at least one of the first entity and the second entity provides the accessed shorthand information item to the communication medium through said input device.

2. An apparatus for training data entry, the apparatus comprising:

a) means for receiving an input identifier through an input device;

b) means for determining whether the input identifier corresponds to one of a longhand information item and a shorthand information item;

c) means for accessing, if the input identifier corresponds to the longhand information item, the shorthand information item associated with the longhand information item determined by the means for determining;

d) means for presenting the accessed shorthand information item through an output device; and e) means for completing the data entry operation only after the accessed shorthand information item is used in a data entry operation.

3. The apparatus according to claim 2, wherein the means for presenting comprises:

a display device through which a visual representation of the accessed shorthand information item is presented.

4. The apparatus according to claim 2, wherein the means for presenting comprises:

a speech output device through which an audible representation of the accessed shorthand information item is presented.

5. The apparatus according to claim 2, wherein the input identifier is a voice signal.

6. The apparatus according to claim 2, wherein the input identifier is a digital signal.

7. The apparatus according to claim 2, wherein the input identifier is a touch-tone signal.

8. A training apparatus for establishing a communication through a communication medium between at least a first entity and a second entity, comprising:

a) receiving an input identifier from an input device;

b) means for determining whether the input identifier corresponds to one of a longhand information item and a shorthand information item;

c) means for accessing, if the input identifier corresponds to the longhand information item, the shorthand information item associated with the longhand information item determined by the means for determining;

d) means for presenting at an output device the accessed shorthand information item to at least one of the first entity and the second entity; and e) means for establishing the communication only if at least one of the first entity and the second entity provides the accessed shorthand information item to the communication medium through said input device.

* * * * *